(12) United States Patent
Cuccias

(10) Patent No.: US 7,477,309 B2
(45) Date of Patent: Jan. 13, 2009

(54) INFRARED CAMERA SYSTEM AND METHOD

(75) Inventor: Frank J. Cuccias, Clifton, VA (US)

(73) Assignee: Lockheed Martin Corporation, Bethesda, MD (US)

(*) Notice: Subject to any disclaimer, the term of this patent is extended or adjusted under 35 U.S.C. 154(b) by 1057 days.

(21) Appl. No.: 10/616,860

(22) Filed: Jul. 10, 2003

(65) Prior Publication Data

US 2008/0309801 A1 Dec. 18, 2008

Related U.S. Application Data

(60) Provisional application No. 60/394,852, filed on Jul. 10, 2002.

(51) Int. Cl.
*H04N 9/64* (2006.01)

(52) U.S. Cl. .................. 348/342; 348/370; 346/419

(58) Field of Classification Search .......... 348/306, 348/342, 335, 222.1; 356/418, 419
See application file for complete search history.

(56) References Cited

U.S. PATENT DOCUMENTS

| | | | | |
|---|---|---|---|---|
| 3,661,458 | A * | 5/1972 | Noemer et al. ............... 355/88 |
| 4,437,111 | A | 3/1984 | Inai et al. ..................... 358/44 |
| 4,695,878 | A | 9/1987 | Levine et al. ................. 358/44 |
| 5,389,788 | A | 2/1995 | Grinberg et al. ............ 250/331 |
| 5,534,696 | A | 7/1996 | Johansson et al. .......... 250/330 |
| 5,689,241 | A | 11/1997 | Clarke, Sr. et al. ......... 340/575 |
| 5,689,442 | A | 11/1997 | Swanson et al. ............ 364/550 |
| 5,751,830 | A | 5/1998 | Hutchinson ................. 382/103 |
| 5,781,236 | A | 7/1998 | Shinbori et al. ............. 348/342 |
| 5,982,423 | A | 11/1999 | Sekiguchi ................... 348/216 |
| 5,986,767 | A * | 11/1999 | Nakano et al. .............. 356/419 |
| 6,051,768 | A * | 4/2000 | Masubuchi ................... 84/433 |
| 6,091,453 | A | 7/2000 | Coan et al. .................. 348/373 |
| 6,124,934 | A * | 9/2000 | Shahar et al. ............... 356/624 |
| 6,255,650 | B1 | 7/2001 | Warner et al. ............... 250/330 |
| 6,370,260 | B1 | 4/2002 | Pavlidis et al. ............. 382/103 |
| 6,400,835 | B1 | 6/2002 | Lemelson et al. ........... 382/118 |
| 6,429,936 | B1 * | 8/2002 | Scaduto ...................... 356/417 |
| 6,494,490 | B1 | 12/2002 | Trantoul ....................... 283/91 |
| 6,667,471 | B2 * | 12/2003 | Bos et al. ................. 250/208.1 |
| 6,756,592 | B1 * | 6/2004 | Smith et al. .............. 250/338.5 |

(Continued)

*Primary Examiner*—Lin Ye
*Assistant Examiner*—Gevell Selby
(74) *Attorney, Agent, or Firm*—Marsh Fischmann & Breyfogle LLP

(57) ABSTRACT

Infrared (IR) camera systems for and a method of obtaining infrared images of target subjects are provided. In one embodiment, an IR camera system (10) includes a lens (12), a number of IR pass filters (14), an optical detector (16), a processor (18) mounted on a circuit board (20), a distance sensor (22), a visible light sensor (24), an IR light sensor (26), an IR illuminator (28), and a number of video outputs (30), all of which may be disposed within an appropriately configured housing (32). The filters (14) are mounted on a juke-box like rack system (34) also included within the housing (32). The processor (18) determines which pass filter is needed in order to optimize the image and sends an electronic signal to the rack system (34) directing the rack system (34) to move the appropriate filter (14) into the optical pathway between the lens (12) and the optical detector (16) and pull all of the other IR filters (14) out of the optical pathway between the lens (12) and the optical detector (16).

32 Claims, 8 Drawing Sheets

U.S. PATENT DOCUMENTS

| | | | |
|---|---|---|---|
| 7,019,777 B2 * | 3/2006 | Sun | 348/263 |
| 2002/0074370 A1 | 6/2002 | Quintana et al. | 224/262 |
| 2003/0147002 A1 | 8/2003 | Ray et al. | 348/370 |
| 2004/0010298 A1 | 1/2004 | Altshuler | 607/88 |

* cited by examiner

INFRARED CAMERA SYSTEM AND METHOD

RELATED APPLICATION INFORMATION

This application claims priority from U.S. Provisional Application Ser. No. 60/394,852 filed on Jul. 10, 2002, and entitled "SYSTEM AND METHOD FOR ACQUIRING, TRANSMITTING AND PROCESSING LIVE AUDIO AND INFRARED VIDEO SIGNAL DATA USING THE LMX-CAM SYSTEM", the entire disclosure of which is incorporated herein.

FIELD OF THE INVENTION

The present invention relates generally to imaging systems, and more particularly to obtaining enhanced images using infrared (IR) optical energy.

BACKGROUND OF THE INVENTION

There are a number of situations wherein it is desirable to obtain video images of target subjects (e.g., persons, vehicles). Such situations include, for example, law enforcement contact with suspects, airport security checkpoints, building and public event access, and the like. Often times, however, video images obtained using visible light may not reveal prohibited materials carried by the subject or may be insufficient for further analysis. One example, is in the area of facial biometrics wherein the presence of glasses, particularly sunglasses, on a person's face can obscure the visibility of facial features such as their eyes that are important to accurate identification.

Since target subjects typically convey (i.e., reflect or emanate) optical energy therefrom other than visible light, it is possible to obtain images of target subjects based on non-visible light optical energy. One example of non-visible optical energy suitable for use in imaging subjects is IR optical energy. However, the ability to obtain high quality IR images of a subject can be effected by changing environmental conditions (e.g., ambient visible and infrared light levels). Further, different portions of the IR spectrum may be more suitable for observing different subjects and different amounts of visible and non-visible light may need to be excluded in order to obtain the optimal subject image.

SUMMARY OF THE INVENTION

Accordingly, the present invention provides an IR camera system and method for use in obtaining IR images of subjects. The IR camera system and method of the present invention incorporate the ability of pass filter optical energy conveyed from the subject in accordance with any one of a plurality of pass bands centered around different wavelengths in the IR spectrum. The appropriate pass band may be automatically selected based on, for example, ambient visible and IR light levels.

According to one aspect of the present invention, an infrared camera system includes a lens, a filter, an optical detector and a control device. The lens is configured to collect optical energy conveyed from a subject. In this regard, the conveyed optical energy includes both optical energy reflected from the subject and optical energy emanating from the subject. The filter provides a plurality of pass bands associated with different center wavelengths within an infrared portion of the electromagnetic spectrum and is operable to pass filter optical energy collected by the lens in accordance with any selected one of its plurality of pass bands. The pass bands of the filter may or may not overlap one another. The optical detector is operable to generate an electrical signal representing an image of the subject in response to optical energy collected by the lens and pass filtered by the filter before being incident on the optical detector. In one embodiment, the optical detector is a charge-couple-device. The control device is operable to select the current pass band of the filter from among the plurality of pass bands.

The filter may be configured in a number of manners in order to provide the plurality of available IR pass bands. In one embodiment, the filter comprises a plurality of separate filters having fixed pass bands and a switching device operable to interpose each of the filters in an optical pathway between the lens and the optical detector. In this regard, there may be four separate having pass bands centered around center wavelengths of 700 nm, 800 nm, 900 nm, and 1000 nm, respectively, with the pass band of each filter being about +/−20 nm from the center wavelength thereof.

In another embodiment, the filter comprises a stationary voltage-controlled, liquid crystal filter pane interposed in an optical pathway between the lens and the optical detector. The filter pane provides a pass band having a center wavelength that is adjustable over a range of wavelengths in response to a voltage level applied thereto. In this regard, the range of wavelengths over which the center wavelength of the pass band of the filter pane is adjustable may range from a center wavelength of 700 nm to a center wavelength of 1000 nm, with the pass band of the filter pane being about +/−1 nm from the center wavelength thereof.

In another embodiment, the filter comprises a filter disk having a plurality of individual filter windows arranged near the outer peripheral edge of the disk. Each filter window has a fixed pass band associated with a different center wavelength. The filter disk is configured for rotation about an axis thereof to interpose a selected one of the filter windows in an optical pathway between the lens and the optical detector. The pass bands of the filter windows may vary from a shorter wavelength (e.g., 700 nm) to a longer wavelength (e.g., 1000 nm) in predetermined increments (e.g., 10 nm), with the pass band of each filter window being about +/−20 nm from the center wavelength thereof.

In another embodiment, the filter comprises a filter disk having a pass band associated with a center wavelength that varies in a continuous manner proceeding around a circumference of the disk. The disk is configured for rotation about an axis thereof to interpose a different section of the filter disk in an optical pathway between the lens and the optical detector. The pass band of the filter disk may vary going around the periphery of the disk from a shorter wavelength (e.g., 700 nm) to a longer wavelength (e.g., 1000 nm) in a predetermined increment (e.g., 1.2 nm) over a predetermined distance (e.g., 1 degree of arc) measured along the circumference of the filter disk, with the pass band of the filter disk being about +/−5 nm from the center wavelength thereof.

The control device may, for example, comprise a microprocessor. The microprocessor may select the pass band based on an ambient visible light level and/or an ambient infrared light level. In this regard, the IR camera system may include a visible light sensor operable to measure the ambient visible light level and an infrared light sensor operable to measure the ambient infrared light level. In certain instances, the ambient infrared light level may not be sufficient to obtain an optimal image of the subject. In this regard, the IR camera system may additionally include an infrared illumination source that is operable to transmit infrared optical energy in the direction of the subject when the ambient infrared light level measured by the infrared light sensor is determined by the microprocessor to be insufficient.

The lens may, for example, comprise auto-focusing type lens that is controllable by the microprocessor. This allows the microprocessor to adjust the auto-focus lens as necessary in order to focus the image of the subject on the optical detector based on, for example, the distance between the lens and the subject. In this regard, the IR camera system may include a distance sensor operable to measure the distance between the lens and the subject.

The electrical signal generated by the optical detector representing the enhanced (i.e. IR pass filtered) image of the subject obtained by the IR camera system may be converted to a video signal by the microprocessor and subsequently output in a number of manners. In this regard, the IR camera system may include one or more video connectors for outputting the video signal via a wired connection (e.g., component video cables, S-video cable, coaxial cable, optical cable). Alternatively, or in addition to having one or more video connectors, the IR camera system may also include a wireless transmitter for outputting the video signal via a wireless connection. In this regard, the wireless transmitter may comprise an NSA-approved Type-1 Encrypted 802.11(a/b/g, etc.) wireless transmitter.

According to another aspect of the present invention, a method of obtaining an infrared image of a subject includes the step of collecting optical energy conveyed from the subject. A desired one of a plurality of pass bands associated with a filter is selected, with each pass band having a center wavelength associated therewith that is within an infrared portion of the electromagnetic spectrum. The collected optical energy is filtered in accordance with the selected pass band of the filter. An electrical signal representing an image of the subject is then generated from the filtered optical energy. The electrical signal may be converted to a video signal and transmitted via a wired and/or a wireless communications link.

In selecting the desired pass band, both an ambient visible light level and an ambient infrared light level may be measured. The desired pass band may be chosen based the measured ambient visible light level and/or the measured ambient infrared light level. Further, when the measured ambient infrared light level is insufficient, an infrared illumination source may be operated to transmit infrared optical energy in the direction of the subject.

Depending upon the nature of the filter employed to pass filter the optical energy, the desired pass band may be selected in a number of manners. For example, a control signal may be sent to a switching system directing the switching system to interpose one of a plurality of separate filters having fixed pass bands in an optical pathway between a lens employed in collecting the optical energy and an optical detector employed in generating the electrical signal. By way of further example, a necessary voltage level may be applied to a filter pane interposed in an optical pathway between the lens and the optical detector to adjust the filter pane to provide the desired pass band. In accordance with another example, a filter disk having a plurality of individual fixed pass band filter windows associated with a different center wavelengths may be rotated to interpose an appropriate one of the filter windows in an optical pathway between the lens and the optical detector. By way of yet a further example, a filter disk having a pass band associated with a center wavelength that varies in a continuous manner proceeding around a circumference of the disk may be rotated to interpose an appropriate section of the filter disk in an optical pathway between the lens and the optical detector.

According to one more aspect of the present invention, an infrared camera system includes a lens, a filter, an optical channel, an optical detector and a transmitter. The lens is configured to collect optical energy conveyed from a subject. The focal length of the lens may be fixed. The filter provides a pass band associated with a center wavelength within an infrared portion of the electromagnetic spectrum and is operable to pass filter optical energy collected by the lens in accordance with its pass band. The pass band of the filter may be fixed. The optical channel extends between the lens and the filter. The optical channel may comprise a shielded fiber optic cable. The optical detector is operable to generate an electrical signal representing an image of the subject in response to optical energy collected by the lens, directed though the optical channel to the filter, pass filtered by the filter in accordance with its pass band, and subsequently incident on the optical detector. The transmitter is operable to transmit the electrical signal via at least one of a wired communications link and a wireless communications link to receiver remote from the IR camera system. All of the components of the IR camera system may be mounted on a pair of glasses or a tactical vest suitable, for example, for wearing by a police officer of the like when approaching subjects.

The IR camera system and method of the present invention have a number of applications and the IR pass filtered images obtainable therewith achieve a number of advantages over visible light images such as allowing a user to see into or see through vehicles with tinted windows, clothing, and sunglasses. State troopers and local law enforcement may utilize such IR camera systems when pulling over a vehicle having heavily tinted windows. The IR imaging capability of the IR camera systems permits a user thereof to see into the vehicle either during the day or at night so that they may observe the occupants of the vehicle before and while approaching the vehicle. The IR pass filtered image can either automatically fine-tune itself to see into the vehicle or be manually controlled to detect potential threats such as armed or hostile occupants. IR camera systems in accordance with the present invention also have the ability to see through various types of clothing fabrics such as wool, cotton, synthetics, and blends. This permits potentially threatening objects such as bullet-proof vests, weapons (knives, guns, etc.), documents, illegal substances, or even hidden messages under a person's clothing to be observed. The ability of the IR camera systems of the present invention to obtain an image of a person's eyes through various types of sunglasses (polarized, non-polarized, and mirrored) make such IR camera systems particularly suited for supporting facial biometrics applications.

These and other aspects and advantages of the present invention will be apparent upon review of the following Detailed Description when taken in conjunction with the accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

IR Camera Systems

Figure 1:
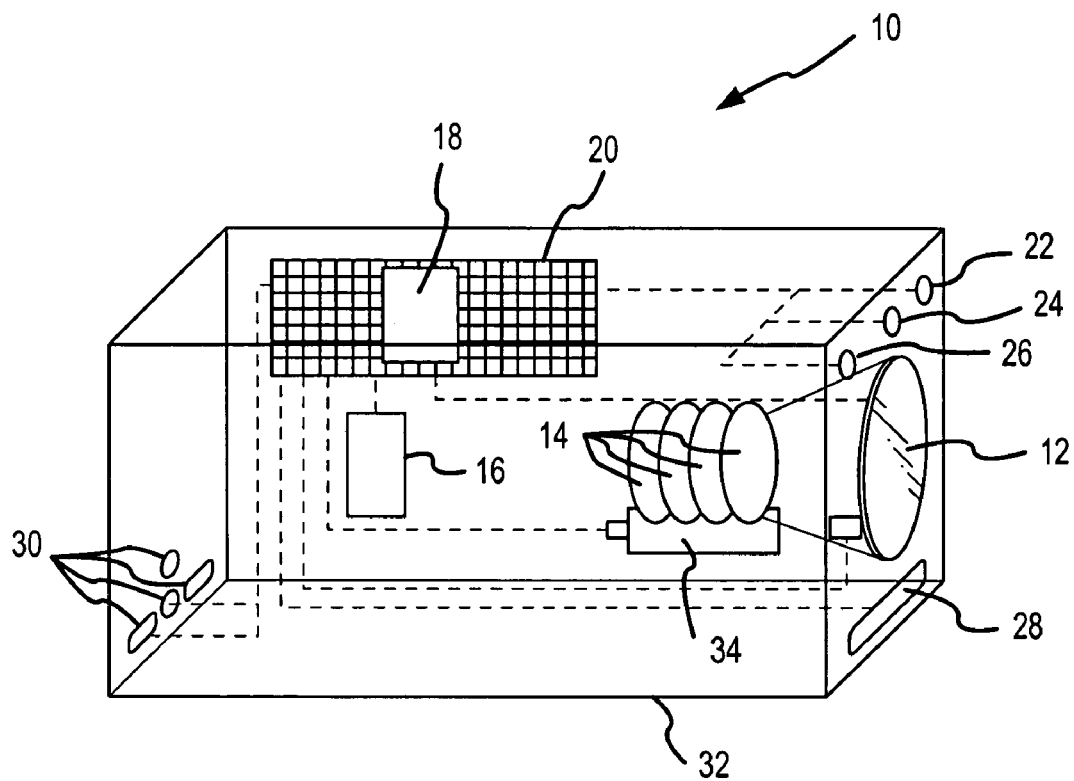
FIG. 1 is a schematic representation of one embodiment of an IR camera system in accordance with the present invention.

Referring to FIG. 1, there is shown one embodiment of an IR camera system 10. The IR camera system 10 includes a lens 12, a number of IR pass filters 14, an optical detector 16, a processor 18 mounted on a circuit board 20, a distance sensor 22, a visible light sensor 24, an IR light sensor 26, an IR illuminator 28, and a number of video outputs 30 (e.g., component video, serial, s-video, firewire), all of which may be disposed within an appropriately configured housing 32. Additional components (not shown) such as, for example, one or more digital-to-analog converters and analog-to-digital converters for interfacing the processor 18 with other components of the IR camera system 10, one or more memory devices (e.g., RAM and/or ROM), and other components, may also be mounted on the circuit board 20. The IR camera system 10 may also include multiple power supply options (not shown) such as, for example, DC, AC, and battery with a mini-solar panel for recharging the battery. The solar panel option allows for extended periods of operation without the need for human intervention related to power.

The lens 12 collects optical energy emitted by or reflected from a target subject of interest (e.g., a person, a vehicle) and focuses the collected optical energy onto the optical detector 16. In the context of the present invention, the term "optical energy" refers to radiation in the IR, visible, ultraviolet and x-ray wavelength ranges of the electromagnetic spectrum. The lens 12 may an auto-focus type lens that is adjustable in response to a control signal from the processor 18 in order to focus the collected optical energy onto the optical detector 16.

The IR pass filters 14 are mounted within the housing in a manner permitting the filters 14 to be selectively interposed in the optical path between the lens 12 and the optical detector 14. In this regard, the filters 14 may be mounted on a juke-box like rack system 34 also included within the housing 32. The filters 14 may be constructed of Schott optical cut and ground precision glass retained within a two-part metal ring, and typically appear completely black to the human eye.

Each of the filters 14 has a predetermined pass band within the IR wavelength range and permits optical energy having wavelengths within its respective pass band to pass through the filter while substantially blocking optical energy with wavelengths outside of its pass band. In this regard, particular wavelengths of optical energy may be considered passed (substantially non-attenuated) by a particular filter when there is less than a 1 dB reduction in the intensity of such energy, whereas particular wavelengths of optical energy may be considered blocked (substantially attenuated) by a particular filter when there is more than a 5 dB reduction in the intensity of such energy. In the present embodiment, there are four filters 14, with a first one of the filters 14 having a pass band centered around 700 nm, a second one of the filters 14 having a pass band centered around 800 nm, a third one of the filters 14 having a pass band centered around 900 nm, and a fourth one of the filters 14 having a pass band centered around 1000 nm. The pass bands of the various filters 14 are +/−20 nm around their respective center wavelengths. It will be appreciated that in other embodiments, there may be more or fewer IR pass filters having wider or narrower pass bands centered at various wavelengths in the IR wavelength range of the electromagnetic spectrum.

The optical detector 16 may be a solid state device such as, for example, a charge-couple device (CCD). The optical detector 16 receives electromagnetic energy focused thereon by the lens 12 and converts such energy to an electrical signal that is directed to the processor 18. The range of wavelengths incident on the optical detector 18 depends upon which, if any, of the filters 14 is interposed in the optical pathway between the lens 12 and the optical detector 16.

The processor 18 receives the electrical signal from the optical detector 16 and converts it to appropriately formatted video signals for output on the video outputs 30. Cables connected the video outputs 30 may then direct the IR images captured by the IR camera system 10 to a monitor, a recording device, an image analysis system or other devices which display, store or further process the IR images.

When IR camera system 10 is operated, the processor 18 obtains information from the visible light sensor 24 regarding the level of ambient visible light and determines how much visible light should be blocked or allowed in order to optimize the image of the subject that is obtained from the optical energy. The processor 18 sends an appropriate control signal to the rack system 34 to activate the appropriate IR filter 14. For instance, if the processor 18 determines that an 800 nm pass filter is needed in order to optimize the image, the processor 18 sends an electronic signal to the rack system 34 directing the rack system 34 to move the 800 nm filter 14 into the optical pathway between the lens 12 and the optical detector 16 and pull all of the other IR filters 14 out of the optical pathway between the lens 12 and the optical detector 16. The IR camera system 10 accomplishes this in an automated fashion without requiring intervention on the part of a human operator. Since switching of filters 14 in and out of the optical pathway between the lens 12 and optical detector 16 is performed automatically on an as-needed basis, the IR camera system 10 is particularly suited for installation on a mobile device or in an area that has frequent changes in ambient light.

In conjunction with switching the appropriate filter 14 into the optical pathway, the processor 18 may also undertake other actions based on information received from the distance sensor 22 and the IR light sensor 26. The distance sensor 22 detects how far the subject of interest is from the IR camera system 10. Such information is used by the processor 18 to adjust the lens 12 to focus the subject image on the optical detector 16 as necessary. The IR light sensor 26 detects the level of ambient IR light. Such information is used by the processor 18 to activate the IR illuminator 28 when the level of ambient IR light is not sufficient. When activated, the IR illuminator 28 transmits IR light, a portion of which is reflected from the subject in order to enhance the image quality. The processor 18 may increase or decrease the amount of IR illumination from the IR illuminator 28 in order to optimize the image of the subject that is obtained by the optical detector 16. If desired, the IR camera system 10 may also include an external power adaptor (not shown) that is controlled by the processor 18 in order to activate a second, more powerful IR illuminator (not shown) that may, for example, be hand-held or externally mounted on the housing 32.

Figure 2:
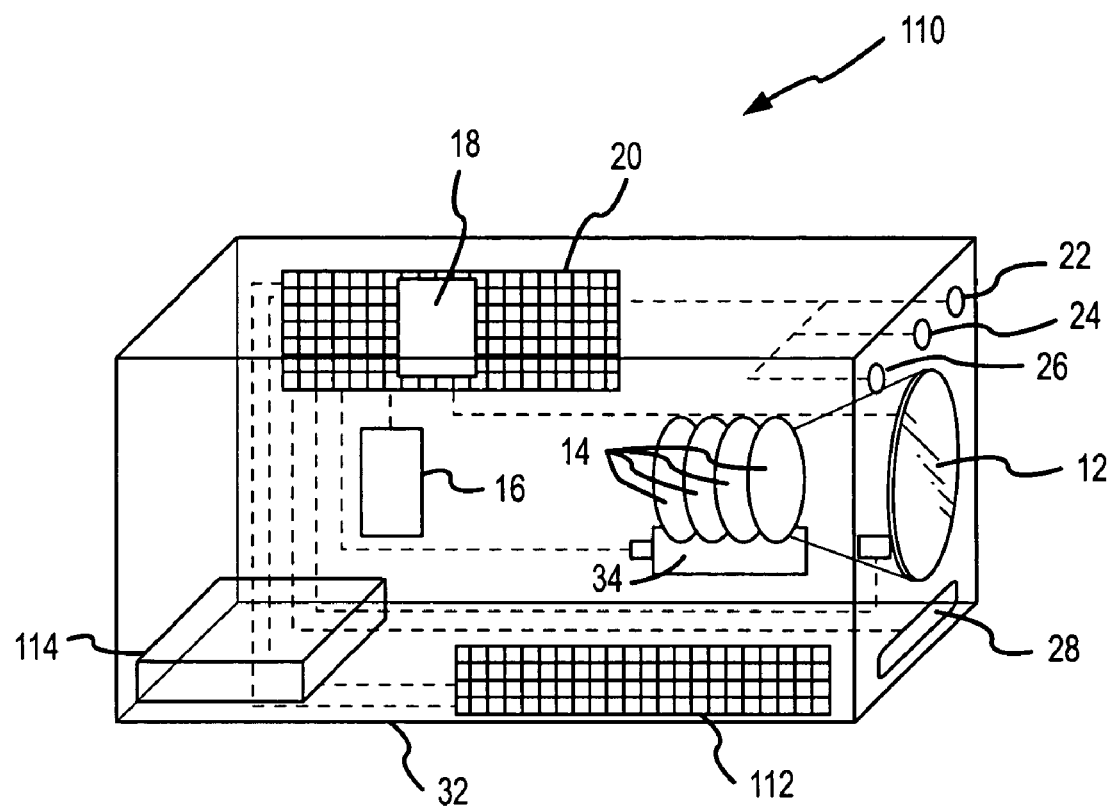
FIG. 2 is a schematic representation of another embodiment of an IR camera system in accordance with the present invention.

Referring now to FIG. 2, there is shown another embodiment of an IR camera system 110 in accordance with the present invention. The IR camera system 110 of FIG. 2 is similar to the IR camera system 10 of FIG. 1, and the same reference numerals are used herein to identify corresponding similar components. The primary difference between the IR camera system 110 of FIG. 2 and the IR camera system 10 of FIG. 1 is that IR camera system 110 is configured for wireless communication of the images acquired thereby to a location remote from the location in which the IR camera system is installed (e.g., to a monitoring room or a relay station which relays acquired images to another location). In this regard, IR camera system 110 includes a second circuit board 112 and, instead of video outputs, a peripheral device port 114 (e.g., a PCMCIA port). The second circuit board 112 includes components for converting the video signal output by the processor 18 to a radio frequency or other signal appropriate for wireless transmission. For example, the components on the second circuit board 112 may convert the video signal from the processor 18 to an 802.11(a/b) wireless networking signal that is directed to the peripheral device port 114 for wireless transmission by an appropriate peripheral device (e.g., an 802.11(a/b) wireless networking PCMCIA card) connected to the port 114. In converting the video signal, the components on the second circuit board 112 may also encrypt the wireless signal (e.g., using Type-1 encryption) to help prevent unauthorized parties from obtaining IR video captured by the IR camera system 110. As may be appreciated, in other embodiments, the IR camera system 110 may include video outputs in addition to the peripheral device port 114 and/or the components on the second circuit board 112 may be incorporated on the main circuit board 20 thereby eliminating the second circuit board 112.

Figure 3:
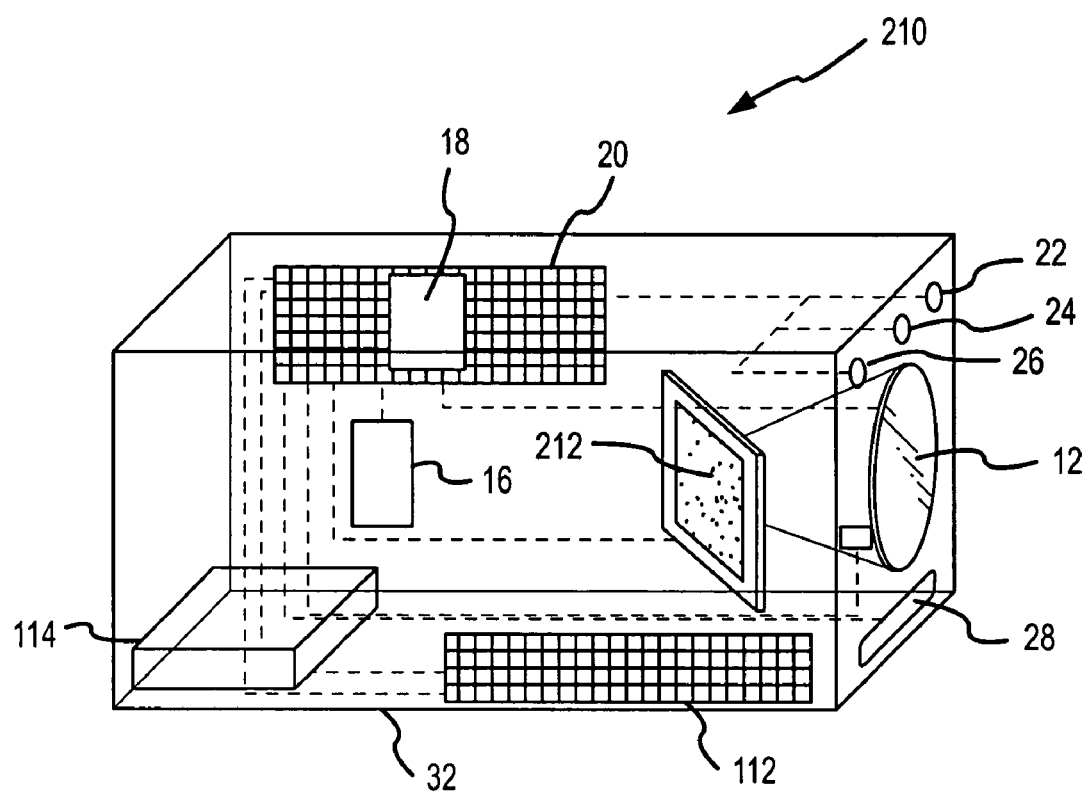
FIG. 3 is a schematic representation of another embodiment of an IR camera system in accordance with the present invention.

Referring now to FIG. 3, there is there is shown another embodiment of an IR camera system 210 in accordance with the present invention. The IR camera system 210 of FIG. 3 is similar to the IR camera systems 10, 110 of FIGS. 1 and 2, and the same reference numerals are used herein to identify corresponding similar components. The primary difference between the IR camera system 210 of FIG. 3 and the IR camera systems 10 and 110 of FIGS. 1 and 2 is that in IR camera system 210, the multiple filters 14 and rack system 34 used to switch the appropriate filter 14 in and out of the optical pathway between the lens 12 and the optical detector 16 have been replaced with a single controllable filter pane 212 that is interposed in the optical pathway between the lens 12 and the optical detector 16. The controllable filter pane 212 is filled with a liquid crystal type of material that reacts to various levels of voltage applied thereto by the processor 18 in order to adjust its IR pass filtering capability. In this regard, the liquid crystal type material may be a colloidal solution such as, for example, water with silver particles suspended therein.

Based on information from the visible light sensor 24 and the IR light sensor 26, an algorithm executed by the processor 18 determines the appropriate amount of visible light blocking that is needed to obtain the optimal image. If the algorithm determines the need for a great deal of IR pass filtering (i.e., blocking a great deal of visible light), then the processor 18 applies the correct amount of voltage to increase the filter's density (become darker). If it is determined that there is a low amount of visible light that needs to be blocked, the processor 18 applies the correct amount of voltage to decrease the filter's density (become lighter). Utilizing the controllable filter pane 212 instead of the rack system 34 and individual fixed bandwidth IR pass filters makes the IR camera system 210 more accurate in collecting images by providing more precise IR pass filtration. It also makes the IR camera system 210 less susceptible to malfunction in environments where there may be jarring or bumping (e.g. on a battlefield, in tactical police operation or other similar environment).

Figure 4:
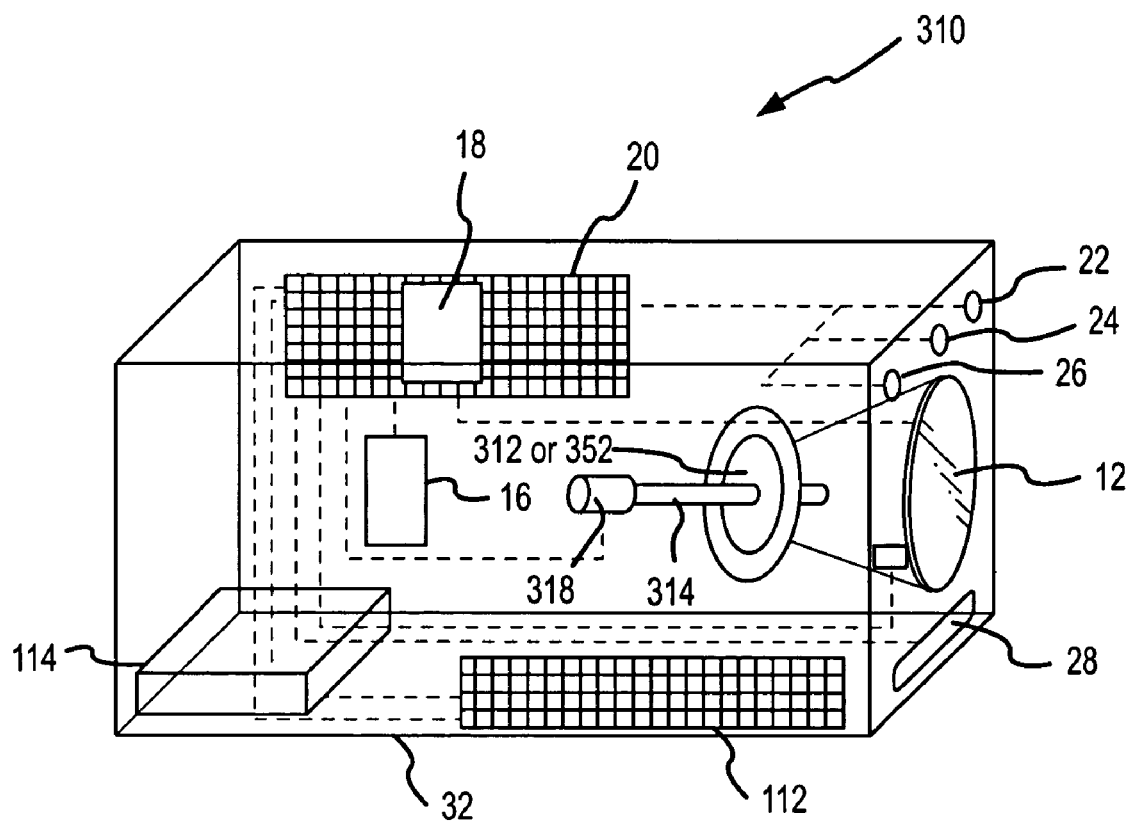
FIG. 4 is a schematic representation of one embodiment of an IR camera system in accordance with the present invention.
Figure 5A:
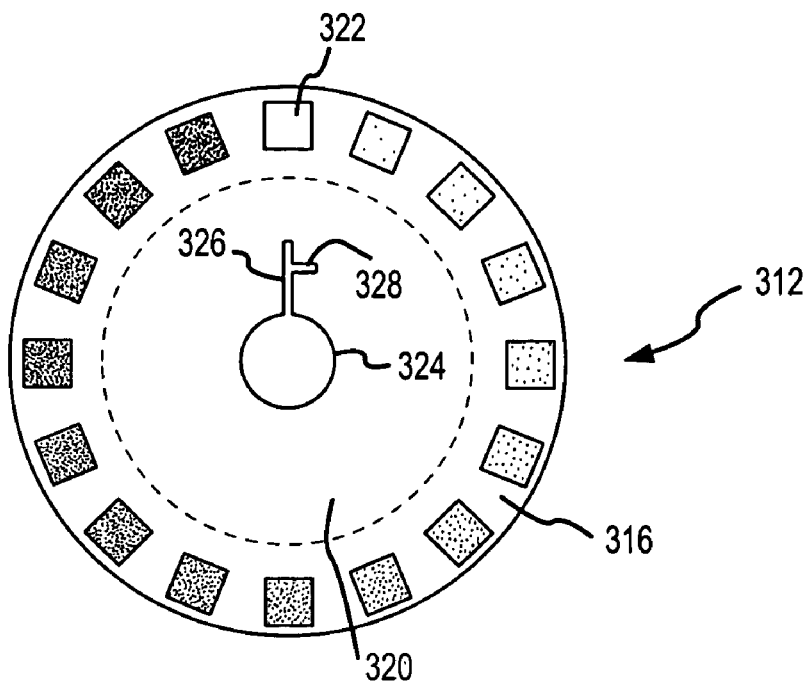
FIG. 5A is a front view of one embodiment of a graduated filter disk that may be included in the IR camera system of FIG. 4.
Figure 5B:
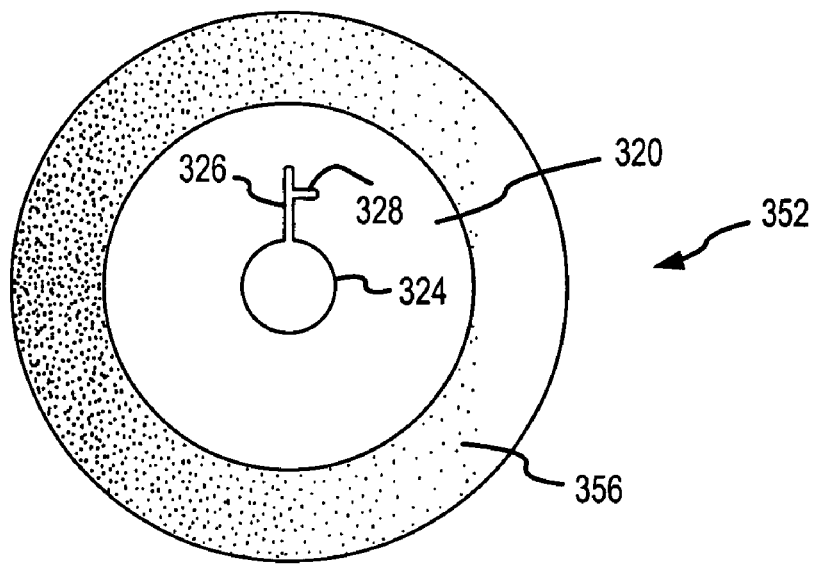
FIG. 5B is a front view of another embodiment of a graduated filter disk that may be included in the IR camera system of FIG. 4.

Referring now to FIG. 4, there is shown another embodiment of an IR camera system 310 in accordance with the present invention. The IR camera system 310 of FIG. 4 is similar to the IR camera systems 10, 110, 210 of FIGS. 1, 2 and 3, and the same reference numerals are used herein to identify corresponding similar components. IR camera system 310 incorporates a graduated IR pass filter disk 312 or 352 such as illustrated in FIGS. 5A-5B to provide the desired IR pass filtering between the lens 12 and optical detector 16 instead of multiple filters 14 and rack system 34 as in IR camera systems 10, 110 or controllable filter pane 212 as in IR camera system 210. In this regard, filter disk 312 or 352 provides IR pass filtering over a range of center wavelengths within the IR wavelength range of the electromagnetic spectrum (e.g., over center wavelengths ranging from 700 nm to 1000 nm), with the center wavelength of the pass band varying in either discrete intervals (filter disk 312) or in a continuous manner (filter disk 352). Filter disk 312 or 352 is mounted on a shaft 314 with an outer portion 316 or 356 of filter disk 312 or 352 intersecting the optical pathway between the lens 12 and optical detector 16. Shaft 314 can be rotated in a controlled manner in order to adjust the angular position of filter disk 312 or 352 and thereby rotate a desired section of the outer portion 316 or 356 of filter disk 312 or 352 into the optical pathway between the lens 12 and optical detector 16. In this regard, shaft 314 may be connected with a stepper motor 318 or the like.

FIG. 5A shows one embodiment of graduated IR pass filter disk 312 wherein the pass band center wavelength varies in discrete intervals. Filter disk 312 comprises a circular support plate 320 including a plurality of individual IR pass filter windows 322 formed in the outer portion 316 of the support plate 320. Circular support plate 322 may, for example, be comprised of metal or a composite material. Each individual IR pass filter window 322 may be comprised of glass that has been treated in order to pass optical energy at wavelengths within a specific pass band and substantially attenuate optical energy at wavelengths outside of the specific pass band. The pass band of each individual IR pass filter window 322 is centered at a different specified center wavelength, with there being a discrete difference in the center wavelengths of adjacent IR pass filter windows 322. In this regard, filter disk 312 may be referred to as "frame-stepped". The pass bands of adjacent filter windows 322 may or may not overlap. In the present embodiment, the center wavelengths increase in equal increments (e.g., 10 nm) proceeding from a starting location around the circumference of the support plate 320 from a shorter wavelength (e.g., 700 nm) to a longer wavelength (e.g., 1000 nm) to provide a filter disk 312 having individual IR pass filter windows 322 with equally spaced center wavelengths (e.g., 700 nm, 710 nm, 720 nm, 730 nm, etc.). In the present embodiment, the pass band of each individual filter window 322 is about +/−20 nm from its respective center wavelength.

The circular support plate 320 includes a hole 324 formed in the center thereof with a slot 326 extending outward from the edge of the hole 324. Hole 324 and slot 326 are configured for receiving the shaft 314. Slot 326 includes a keying portion 328 that receives a corresponding key element on the shaft 314 in order to ensure that the proper side of the filter disk 312 faces the lens 12. Based on information from the visible light sensor 24 and the IR light sensor 26, an algorithm executed by the processor 18 determines which of the individual IR pass filter windows 322 provides the appropriate band pass filtering in order to obtain the optimal image. Processor 18 sends a control signal to the stepper motor 318 causing the shaft 314 to rotate until the angular position of filter disk 312 is adjusted such that the appropriate IR pass filter window 322 intersects the optical pathway between the lens 12 and the optical detector 316.

FIG. 5B shows one embodiment of graduated IR pass filter disk 352 wherein the pass band center wavelength varies in a continuous manner. Filter disk 352 comprises a circular shaped piece of glass that has been treated in order to pass optical energy at wavelengths within a specific pass band and substantially attenuate optical energy at wavelengths outside of the specific pass band, with the center wavelength of the pass band varying in a continuous manner proceeding around the circumference of the disk 352. In the present embodiment, the center wavelength begins at a shorter wavelength (e.g., 700 nm) and progresses smoothly to a longer wavelength (e.g., 1000 nm) then progresses smoothly back to the shorter wavelength (e.g., 700 nm) proceeding around the circumference of the filter disk 352. The manner in which the center wavelength varies may be linear in order to facilitate positioning to the appropriate section of the outer portion 356 of filter disk 352 in the optical pathway between lens 12 and optical detector 16. In this regard, for every 1 degree of arc (of circumference), the center wavelength of the pass band may increase/decrease 1.2 nm. As may be appreciated the pass band of the filter disk 352 is determined by the size of the area of the outer portion 356 of filter disk 352 intersecting the optical pathway. In other embodiments, the glass may be treated such that the center wavelength of the pass band starts at a shorter wavelength (e.g., 700 nm) and increases to a longer wavelength (e.g., 1000 nm) proceeding around the circumference of the disk, reaching the longer wavelength adjacent to the shorter wavelength.

The continuous filter disk 352 also includes a circular support plate 320 attached the glass comprising filter disk 352 and having a hole 324 formed in the center thereof with a slot 326 extending outward from the edge of the hole 324. Hole 324 and slot 326 are configured for receiving the shaft 314. In this regard, the piece of glass comprising filter disk 352 may have a hole and slot formed therein aligned with hole 324 and slot 326 formed in support plate 320, or it may have a hole with a radius extending beyond the outer extent of slot 326, thereby permitting shaft 314 to extend through the glass filter disk 352 as well. Slot 326 includes a keying portion 328 that receives a corresponding key element on the shaft 314 in order to ensure that the proper side of the filter disk 352 faces the lens 12. Based on information from the visible light sensor 24 and the IR light sensor 26, an algorithm executed by the processor 18 determines which section of the outer portion 356 of filter disk 353 provides the appropriate band pass filtering in order to obtain the optimal image. Processor 18 sends a control signal to the stepper motor 318 causing the shaft 314 to rotate until the angular position of filter disk 352 is adjusted such that the appropriate section of the outer portion 356 of filter disk 352 intersects the optical pathway between the lens 12 and the optical detector 316.

Each of the previously described embodiments of the IR camera system, 10, 110, 210, 310 may have multiple power supply capabilities such as DC, AC, and battery with a mini-solar panel for recharging. The solar panel option allows for extended periods of remote operation without the need for human intervention related to power considerations. Each of the previously described embodiments of the IR camera system, 10, 110, 210, 310 can be used overtly or covertly. Brackets can be used to mount the housing 32 of IR camera systems 10, 110, 210, 310 to weapons, such as, for example, an M-16 or a MP-5. Each of the previously described embodiments of the IR camera system, 10, 110, 210, 310 may also be deployed in either a human-controlled manner or a remote-controlled manner. In either case (human or remote control), distance limitations may be a consideration, particularly with wireless IR camera system 110.

Figure 6:
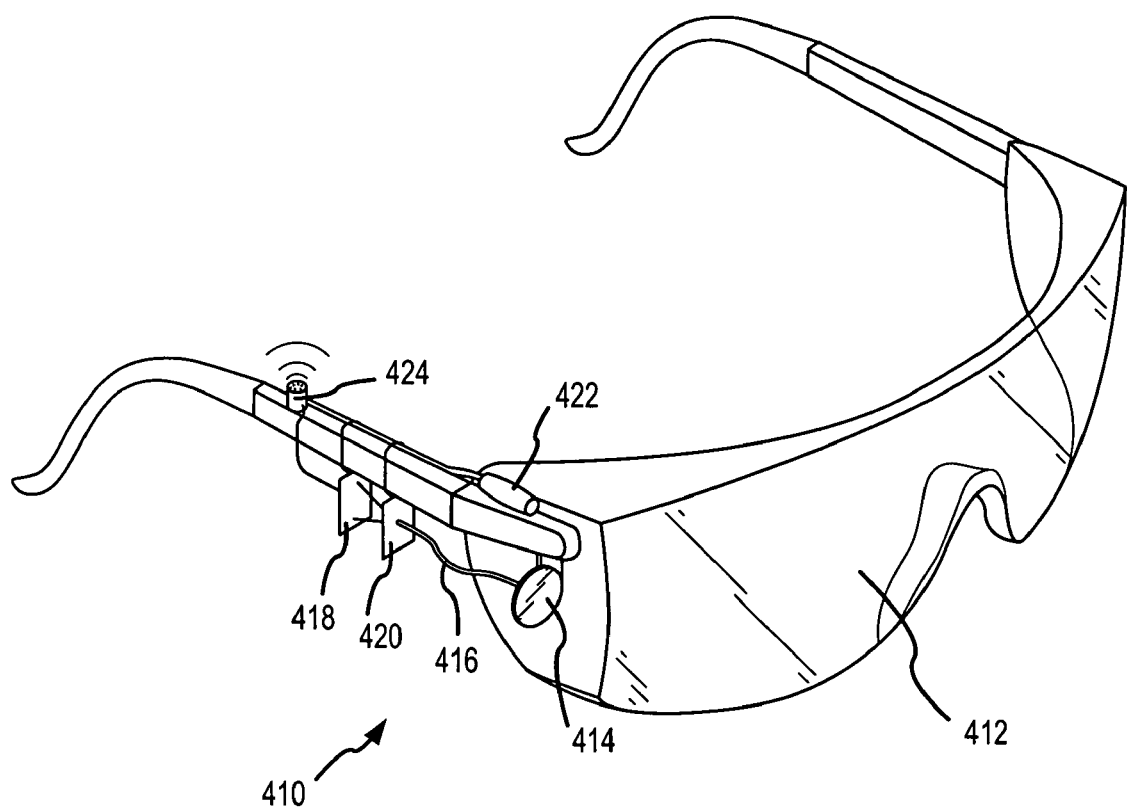
FIG. 6 is a schematic representation of one embodiment of an IR camera system in accordance with the present invention.

Referring now to FIG. 6, there is shown another embodiment of an IR camera system 410 in accordance with the present invention. Due to its small size and relatively non-obtrusive characteristics, IR camera system 410 is particularly suited for use by individuals such as law enforcement officers, security personnel, and the like who regularly observe subjects of interest. In the present embodiment, IR camera system 410 is supported on a pair of glasses 412 (e.g., clear glasses or sunglasses) that may be worn by a person. In other embodiments, IR camera system may be supported on a tactical vest or other article of clothing. IR camera system 410 includes a miniature lens 414 attached to a shielded fiber optic channel 416 that leads to a miniature optical detector 418 (e.g., a CCD). Lens 414 may be a fixed-focus lens in order to minimize the size and weight of IR camera system 410. In this regard, the focal length of lens 414 may be selected to optimize focusing of subjects that are within a particular range of distances from a wearer of the glasses 412 (e.g., from 2 to 10 meters away from the wearer, 10 to 30 meters away from the wearer, or 30 to 50 meters away from the wearer). In front of the optical detector 418 is a miniature IR pass filter 420. IR pass filter 420 may be a fixed pass band filter in order to minimize the size and weight of IR camera system 410. In this regard, the pass band of IR pass filter 420 may be selected to optimize the subject image obtained under different ambient visible and IR light conditions (e.g., nighttime conditions, dawn conditions, midday conditions, dusk conditions). In addition to the optical components (lens 414, fiber optic channel 416, optical detector 418, IR pass filter 420), IR camera system 410 may also include a small microphone 422 that may be embedded into the front of the glasses 412 frame in order to obtain audio information in addition to video images. IR camera system 410 may be powered by battery (not shown) either embedded in the frame of the glasses 412 or wired from a separate pack unit (not shown). If the frame or arms of the glasses 412 are sufficient in size and dimension, small solar cells (not shown) may be used as a means of recharging the batteries for on-again/off-again "burst" operation.

The IR camera system 410 may send or display the audio and visual (A/V) information obtained therewith in several manners. One manner is via a micro-transmitter 424 in the frame or arms of the glasses 412. Micro-transmitter 424 sends a signal including the A/V information to a local receiver (not shown) that may be worn by the wearer of the glasses 412. The local receiver picks up the signal and retransmits the signal to a larger receiver where it is passed to a central control center for viewing, recording, or processing (e.g., facial biometrics). Another manner of displaying the A/V information is to send the IR pass filtered video received by the optical detector 418 back to one or both of the glass eye pieces (either whole screen or picture in frame) using a miniature projection device (not shown). Another manner is to take the output from optical detector 418 via a miniature copper wire (not shown) down to a pack unit (not shown) hidden on the small of the back or in another convenient location on the wearer's body. The pack contains a small recording device for recording the A/V information onto a recording media (e.g., tape, CD or DVD) that may be extracted and reviewed at a later time. The A/V information can also be sent via a wireless connection to a local receiver from the pack unit.

Communication of A/V Data Obtained by IR Camera Systems

Figure 7:
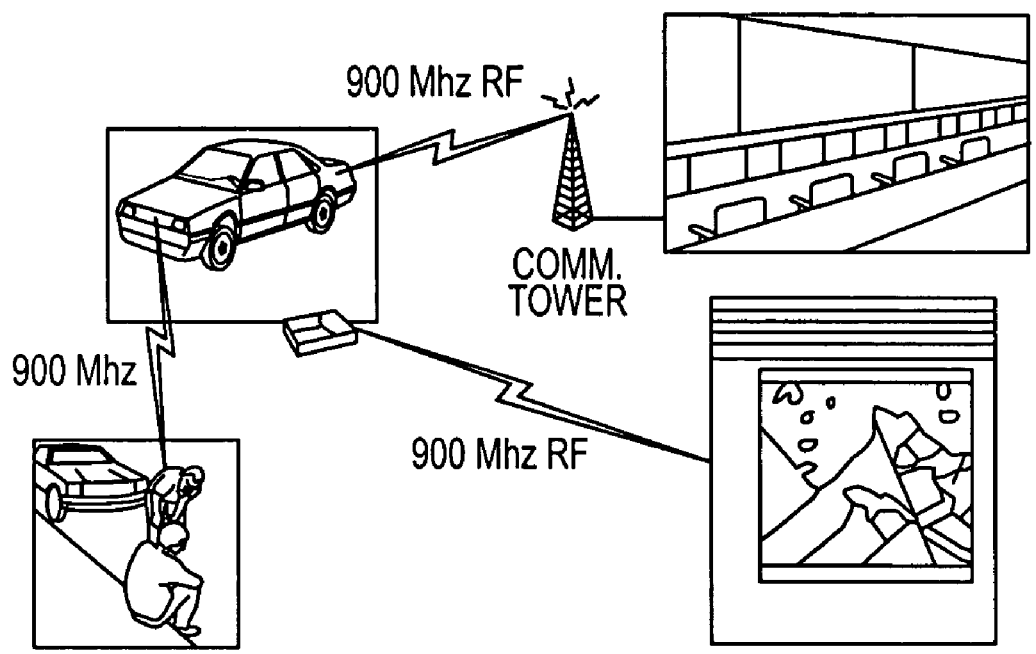
FIG. 7 provides and overview of one example of how images obtained by an IR camera system in accordance with the present invention may be communicated to locations remote from the camera.
Figure 8:
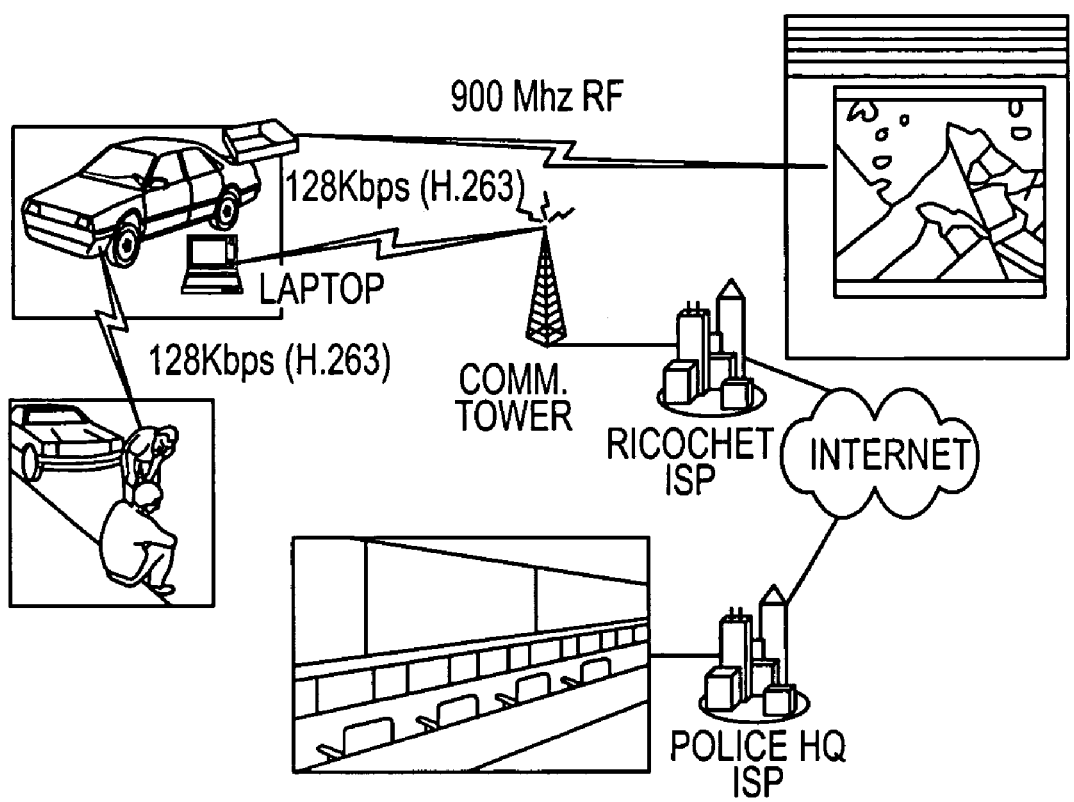
FIG. 8 provides and overview of another example of how images obtained by an IR camera system in accordance with the present invention may be communicated to locations remote from the camera.

Referring now to FIGS. 7 and 8, there are illustrated two examples of different manners in which A/V data obtained using the IR camera systems may output to other devices in the same or other locations as the IR camera systems. The real-time output of the audio and modified video (A/mV) obtained by IR camera systems such as described above can be displayed in real-time on a small liquid crystal display (LCD) screen in a police cruiser, emergency vehicle, surveillance vehicle, or the like. The A/mV data may also be transmitted in a variety of manners to other equipment such as recording equipment (e.g., CD, DVD, videotape) within the vehicle using various types of copper wiring (UTP, COAX, etc.) or fiber optic cabling. As illustrated in FIG. 7, the A/mV data may also be transmitted to locations remote from the vehicle using a Radio Frequency (RF) Video Transmission link. The A/mV feed from the IR camera system is relayed to a receiver on a radio-frequency signal (e.g., a 900 mHZ signal, a 2.4 GHz signal). The receiver may be connected to a computer, which could store or transmit video data over a wireless network. As illustrated in FIG. 8, the A/mV data may also be transmitted using Voice & Video over Internet Protocol (VVoIP). In this regard, video data is sent at rates of 128.8 Kbps (or greater), using wireless modems, to an ISP (internet service provider). The video may be compressed using an H.263 codec allowing a high frame rate at low speeds or under heavily utilized networks. Infrastructures for this type of wireless data transmission exists, and are run by companies such as Ricochet, Verizon, and Nortel. The data passes through the Internet in an encrypted manner to its destination. In the example shown in FIG. 8, an officer who is questioning a man on the street is using a tactical vest version of the IR camera system. Along with a small high-gain microphone, the system is sending the audio and modified (IR pass filtered) video to his police cruiser. It is then sent from the cruiser to the ISP and the police HQ Operations Center via VVoIP. It is also being recorded to a VHS or CDRW unit located in the trunk of the cruiser.

IR sensitive video from a dash-mounted IR camera system can also be used to covertly scan through heavily tinted car windows—allowing the officer to better judge a situation before exiting his cruiser and approaching the pulled-over car or truck. Together with his tactical vest rig, the voice and video is being sent simultaneously to Police HQ and the recording unit in the back of his car. If the situation develops to the point where additional assets are required, other officers in SWAT or Emergency Response Team vehicles can obtain a video feed either from Police HQ or the primary cruiser on the scene thus allowing assets on or near the site to react with greater knowledge of the situation (e.g. potential hostage situation, suicide, bomb, hazmat, etc.).

Potential Applications of IR Camera Systems

IR camera systems such as described above have a number of applications, several of which are summarized herein below. In some applications, the previously described IR camera systems may be modified in various manners in order to adapt such systems for a particular application.

State Trooper/Law Enforcement Applications

This application of the IR camera systems involves two basic concepts. The first is a dashboard-mounted unit inside a police or state trooper cruiser. The IR camera system unit would provide enhanced video capability to the officer, viewed on a dash-mounted color LCD screen or laptop, by being able to see into the car through the tinted windows. It could also provide Police HQ with live video and audio via communications links such as previously described. The second concept is a mini (bullet) camera unit mounted on an officer's tactical vest, sunglasses, or other article of clothing. Such an IR camera system might not include the same sophisticated array of light sensors and filters as a larger unit, but would include a fixed IR pass filter and a built-in IR illuminator to provide the necessary level of IR light for the camera unit to obtain an optimal image. The vest camera, along with a mini-microphone could be wired to a pack on the officer's utility belt. The utility belt would have a battery pack and transmitter that would send the video and audio back to the police cruiser. The cruiser communication system would bundle that A/V input with the dashboard camera unit and send the A/V information, in real-time, to Police HQ. The A/V signal might only be sent to Police HQ in the event the officer depresses a "start transmission" button. If the officer was unresponsive to an HQ inquiry, the IR camera system might be remotely activated by sending a signal from Police HQ.

Airport Security & Scanning Applications

The IR camera systems may be used to scan individuals as they walk through a "scanning portal" at airport entrances or gateways. These portals can be overt (open) or covert (hidden). The advantage to the portal concept is that the environmental conditions (temperature, visible light level, IR light level, humidity, etc.) are all pre-set and controllable resulting in minimal (if any) adjustments to the IR pass filtration. This type of system can be used for facial biometrics, and as a pre-screen for drugs, weapons, electronics, etc., with substantial advantage being in the facial biometrics area where the IR camera system(s) can see through glasses to obtain facial images including a subjects eyes. Data from the IR camera system(s) can be transmitted back to a central control or security center either via wireless (RF, 802.11, or VVoIP) or via wired (UTP, Coax) or fiber optic cable communications links.

Government Office Entrance Applications

The IR camera systems may be deployed at numerous government facilities that require restricted access. Since many government agencies have an ID badge system, their facial biometrics data could be incorporated into the badge. For more secure sites, a PIN could be used as an additional means of ID verification along with the facial biometrics data. Data from the LMX-CAM unit(s) may be transmitted back to a central control or security center either via wireless (RF, 802.11, or VVoIP) or via wired (UTP, Coax) or fiber optic cable communications links.

Garage Entrance Applications

Garage entrances may also be a useful place to deploy the IR camera systems. In addition to employing an IR camera system as part of an entrance key system, the IR camera system may also be used to either build a facial recognition database or as a covert scanning portal. For instance, if a suspected terrorist or known criminal was going to try to seek safety in an apartment building, or meet a contact at a shopping mall (traditionally a difficult place to search for people due to the large quantity of diverse people), the IR camera system could scan each person either pulling into the garage or leaving the garage. This could be applied to both persons in a vehicle as well as those entering or leaving on foot. Data from the IR camera system(s) can be transmitted back to a central control or security center either via wireless (RF, 802.11, or VVoIP) or via wired (UTP, Coax) or fiber optic cable communications links.

ATM (Money Machine) Applications

The IR camera systems can be applied to the banking industry by adding one or more facial biometrics values as an encoded data element on an ATM card. Together with the PIN (personal identification number), an encoded facial recognition numeric value would be extremely helpful in providing additional assurance to credit card companies, banks and customers alike. Someone trying to withdraw finds from an account using a stolen ATM card, would not be permitted to do so since they would fail the facial biometrics test when their face produces an incorrect facial biometrics numeric result. The card would then be kept by the ATM and local law enforcement as well as the bank would be notified of this illegal attempt to steal funds. Data from the LMX-CAM unit(s) can be transmitted back to a central control or security center either via wireless (RF, 802.11, or VVoIP) or via wired (UTP, Coax) or fiber optic cable communications links.

Crowd Scanning

Crowd scanning at large public events such as football games, soccer matches, tennis matches, golf tournaments, concerts, movies, and space launch events (e.g. NASA) may be greatly enhanced by the IR camera systems since patrons wearing sunglasses would no longer be a problem for facial biometric engines. IR camera systems incorporating a range of IR band pass filtering capabilities such as the multiple selectable filters 14 in IR camera system 10 or 110, the controllable IR filter pane 212 such as in IR camera system 210, or the filter disks 312 or 352 in IR camera system 310 provides optimal results since there is a wide range of environmental factors in each arena that would have to be accounted for. Data from the LMX-CAM unit(s) can be transmitted back to a central control or security center either via wireless (RF, 802.11, or VVoIP) or via wired (UTP, Coax) or fiber optic cable communications link.

Schools Applications

The IR camera systems may be applied to schools in districts that are concerned about security and access, as well as weapon and drug detection. Similar to "scanning portals" at airports, schools can erect units where the environmental conditions (e.g., ambient visible and IR light levels) are fairly constant. The school could incorporate facial biometric data on student ID cards. Data from the LMX-CAM unit(s) can be transmitted back to a central control or security center either via wireless (RF, 802.11, or VVoIP) or via wired (UTP, Coax) or fiber optic cable communications links.

Border Control Applications

The IR camera systems may be applied to border checkpoints that are concerned about security and access, as well as weapon and drug detection. Similar to "scanning portals" at airports, border checkpoints can erect units where the environmental conditions (e.g., ambient visible and IR light levels) are fairly constant for foot or car traffic. The INS (or other agency) could incorporate facial biometric data on visitor ID cards. A tactical vest or sunglasses unit would also be very applicable in this application since officers/agents often circulate among the patrons. Data from the LMX-CAM unit(s) can be transmitted back to a central control or security center either via wireless (RF, 802.11, or VVoIP) or via wired (UTP, Coax) or fiber optic cable communications link.

Department of Defense/Military Applications

The IR camera systems may be installed in fixed locations, installed on land, water or airborne vehicles or other equipment, or carried by personnel. The IR camera systems can be used in a variety of situations such as very low or no light environments, seeing through fatigues (uniforms) to determine if an enemy soldier has a Kevlar (or similar) vest under his uniform for pin-point accuracy, seeing through various types of camouflage that cover tanks, vehicles, weapons, personnel, aircraft, etc. Such data from the IR camera systems can be utilized in the filed and/or be transmitted back to a central control or security center either via wireless (RF, 802.11, or VVoIP) or via wired (UTP, Coax) or fiber optic cable communication links.

Stealth Craft Detection Applications

The IR camera systems can also be used to detect IR signatures from craft (aircraft, sea craft, etc.) deploying stealth technologies.

Aircraft Detection Through Cloud Applications

The IR camera systems can also detect IR signatures from aircraft flying through clouds during the day and night.

Underwater Visual Extension Applications

The IR camera systems can also be used to increase visual capabilities underwater in a covert manner. A typical application of the IR camera systems would be for submarine commanders to increase their ability to visually see above, below, ahead of, behind, to the port side or to the starboard side of the vessel. The data received would be displayed on an internal video display or computer, and can be recorded for archiving purposes.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. An infrared camera system comprising:
    an infrared illumination source operable to transmit infrared optical energy in the direction of a subject when an ambient infrared light level is determined to be insufficient;
    a lens configured to collect optical energy conveyed from the subject;
    a filter providing a plurality of pass bands associated with different center wavelengths within an infrared portion of the electromagnetic spectrum, said filter being operable to pass filter optical energy collected by said lens in accordance with any selected one of its plurality of pass bands;
    an optical detector operable to generate an electrical signal representing an image of the subject in response to optical energy collected by said lens, pass filtered by said filter in accordance with a desired pass band selectable from among the plurality of pass bands, and subsequently incident on said optical detector;
a control device operable to select the desired pass band from among the plurality of pass bands provided by said filter, wherein said control device comprises a microprocessor and wherein said microprocessor selects the desired pass band based on at least one of an ambient visible light level and an ambient infrared light level;
a visible light sensor operable to measure the ambient visible light level; and
an infrared light sensor operable to measure the ambient infrared light level;
wherein said infrared illumination source is operated to transmit infrared optical energy in the direction of the subject when the ambient infrared light level measured by said infrared light sensor is determined by said microprocessor to be insufficient.

2. The system of claim 1 wherein at least two of the pass bands of said filter overlap.

3. The system of claim 1 wherein none of the pass bands of said filter overlap.

4. The system of claim 1 wherein said filter comprises:
a plurality of separate filters having fixed pass bands; and
a switching device operable to interpose each of said filters in an optical pathway between said lens and said optical detector.

5. The system of claim 4 wherein said plurality of separate filters comprises first, second, third and fourth filters having pass bands centered around center wavelengths of 700 nm, 800 nm, 900 nm, and 1000 nm, respectively.

6. The system of claim 5 wherein the pass band of each of said first, second, third and fourth filters is +/−20 nm from the center wavelength thereof.

7. The system of claim 4 wherein each said separate filter comprises glass retained within a metal ring.

8. The system of claim 7 wherein said separate filters are coupled with said switching device by a hinge attached to said metal ring, said switching device being operable to pivot said filters about said hinge in order to selectively interpose said filters into said optical pathway.

9. The system of claim 1 wherein said filter comprises:
filter pane interposed in an optical pathway between said lens and said optical detector, said filter pane providing a pass band having a center wavelength that is adjustable over a range of wavelengths in response to a voltage level applied thereto.

10. The system of claim 9 wherein the range of wavelengths over which the center wavelength of the pass band of said filter pane is adjustable ranges from a center wavelength of 700 nm to a center wavelength of 1000 nm.

11. The system of claim 10 wherein the pass band of said filter pane comprises +/−20 nm from the center wavelength thereof.

12. The system of claim 1 wherein said filter comprises:
a filter disk having a plurality of individual filter windows, each said filter window having a fixed pass band associated with a different center wavelength, said disk being configured for rotation about an axis thereof to interpose a selected one of said filter windows in an optical pathway between said lens and said optical detector.

13. The system of claim 12 wherein the center wavelengths of the pass bands of said filter windows vary from a shorter wavelength to a longer wavelength in predetermined increments.

14. The system of claim 13 wherein the shorter wavelength is 700 nm, the longer wavelength is 1000 nm, and the predetermined increments are 10 nm.

15. The system of claim 12 wherein the pass band of each said filter window comprises +/−20 nm from the center wavelength thereof.

16. The system of claim 1 wherein said filter comprises:
a filter disk having a pass band associated with a center wavelength that varies in a continuous manner proceeding around a circumference of said disk, said disk being configured for rotation about an axis thereof to interpose a different section of said filter disk in an optical pathway between said lens and said optical detector.

17. The system of claim 16 wherein the center wavelength of the pass band of said filter disk varies from a shorter wavelength to a longer wavelength in a predetermined increment over a predetermined distance measured along the circumference of said filter disk.

18. The system of claim 17 wherein the shorter wavelength is 700 nm, the longer wavelength is 1000 nm, the predetermined increment is 1.2 nm and the predetermined distance is 1 degree of arc.

19. The system of claim 16 wherein the pass band of said filter disk comprises +/−5 nm from the center wavelength thereof.

20. The system of claim 1 wherein said optical detector comprises a charge-couple-device.

21. The system of claim 1 wherein said lens comprises an auto-focus lens controllable by said microprocessor, and wherein said microprocessor adjusts said auto-focus lens in order to focus the image of the subject on said optical detector based on a distance between said auto-focus lens and the subject.

22. The system of claim 21 further comprising a distance sensor operable to measure the distance between said auto-focus lens and the subject.

23. The system of claim 1 wherein said microprocessor is operable to convert the electrical signal generated by said optical sensor into a video signal.

24. The system of claim 23 further comprising at least one video connector for outputting the video signal via a wired connection.

25. The system of claim 23 further comprising a wireless transmitter for outputting the video signal via a wireless connection.

26. The system of claim 25 wherein said wireless transmitter comprises an 802.11 wireless transmitter.

27. An infrared camera system comprising:
a lens configured to collect optical energy conveyed from a subject;
a filter providing a pass band associated with a center wavelength within an infrared portion of the electromagnetic spectrum, said filter being operable to pass filter optical energy collected by said lens in accordance with its pass band;
an optical channel between said lens and said filter;
an optical detector operable to generate an electrical signal representing an image of the subject in response to optical energy collected by said lens, directed though said optical channel to said filter, pass filtered by said filter in accordance with the pass band of said filter, and subsequently incident on said optical detector; and
a micro-transmitter operable to transmit the electrical signal via at least one of a wired communications link and a wireless communications link;
wherein said lens, filter, optical channel, optical detector and micro-transmitter are mounted on one of a pair of glasses and a vest wearable by a person.

28. The system of claim 27 wherein said optical channel comprises a shielded fiber optic cable.

29. The system of claim 27 wherein a focal length of said lens is fixed.

30. The system of claim 27 wherein the pass band of said filter is fixed.

31. The system of claim 27 wherein said optical detector comprises a charge-couple-device.

32. An infrared camera system comprising:

a lens configured to collect optical energy conveyed from a subject;

a filter providing a plurality of pass bands associated with different center wavelengths within an infrared portion of the electromagnetic spectrum, said filter being operable to pass filter optical energy collected by said lens in accordance with any selected one of its plurality of pass bands, said filter comprising a filter disk having a pass band associated with a center wavelength that varies in a continuous manner proceeding around a circumference of said disk, said disk being configured for rotation about an axis thereof to interpose a different section of said filter disk in an optical pathway between said lens and said optical detector, wherein the center wavelength of the pass band of said filter disk varies from a shorter wavelength to a longer wavelength in a predetermined increment over a predetermined distance measured along the circumference of said filter disk, and wherein the shorter wavelength is 700 nm, the longer wavelength is 1000 nm, the predetermined increment is 1.2 nm and the predetermined distance is 1 degree of arc;

an optical detector operable to generate an electrical signal representing an image of the subject in response to optical energy collected by said lens, pass filtered by said filter in accordance with a desired pass band selectable from among the plurality of pass bands, and subsequently incident on said optical detector; and a control device operable to select the desired pass band from among the plurality of pass bands provided by said filter.

\* \* \* \* \*